United States Patent [19]

Inoue

[11] 4,417,962
[45] Nov. 29, 1983

[54] ELECTROEROSIVE MACHINING METHOD AND APPARATUS WITH DISCRETE METALLIC ELECTRODE BODIES

[75] Inventor: Kiyoshi Inoue, Tokyo, Japan

[73] Assignee: Inoue-Japax Research Incorporated, Yokohama, Japan

[21] Appl. No.: 262,931

[22] Filed: May 12, 1981

[30] Foreign Application Priority Data

May 15, 1980 [JP]  Japan .................. 55-64468

[51] Int. Cl.³ .................. B23P 1/04; B23P 1/10; B23P 1/12; B23K 9/16
[52] U.S. Cl. .................. 204/129.46; 204/129.55; 204/129.6; 204/129.7; 204/224 M; 204/225; 204/284; 204/292; 204/293; 219/69 M; 219/69 D; 219/69 W; 219/69 E
[58] Field of Search .............. 204/129.55, 129.46, 204/129.6, 224 M, 225, 294, 284, 129.7, 292–293; 219/69 E, 69 D, 69 M, 69 W

[56] References Cited

U.S. PATENT DOCUMENTS

| | | | |
|---|---|---|---|
| 2,909,641 | 10/1959 | Kucyn .................. | 219/69 E |
| 3,433,727 | 3/1969 | Keeleric .................. | 219/69 E X |
| 3,622,735 | 11/1971 | Mainwaring .................. | 219/69 E |
| 3,710,067 | 1/1973 | Ullmann et al. .................. | 219/69 M X |
| 3,719,579 | 3/1973 | Cross et al. .................. | 219/69 E X |

FOREIGN PATENT DOCUMENTS

| | | | |
|---|---|---|---|
| 53-12897 | 5/1978 | Japan .................. | 219/69 E |
| 787731 | 12/1957 | United Kingdom . | |
| 650765 | 2/1979 | U.S.S.R. .................. | 204/129.46 |

Primary Examiner—Donald R. Valentine
Attorney, Agent, or Firm—Karl F. Ross; Herbert Dubno

[57] ABSTRACT

A novel electroerosion machining method and apparatus makes use of an elongate, open-ended tubular casing of a heat-resistant material retaining therein discrete metallic bodies (e.g. granular particles, flakes, fine powdery particles or broken wires) in a packed state. The casing is axially juxtaposed with a workpiece to define a machining site in the region of the latter proximate to the open-end portion of the casing and traversed by a machining liquid. A conventional electroerosion power supply furnishes a machining current between the workpiece and the discrete metallic bodies in the casing successively fed into the machining site to electroerosively remove material from the region of the workpiece against the discrete metallic bodies functioning as continuously consumed eletroerosion electrodes in the machining liquid medium. The casing and the workpiece are relatively displaced three-dimensionally to cause the open-end portion of the casing to sweep over the workpiece to form a desired cavity of desired shape therein.

33 Claims, 4 Drawing Figures

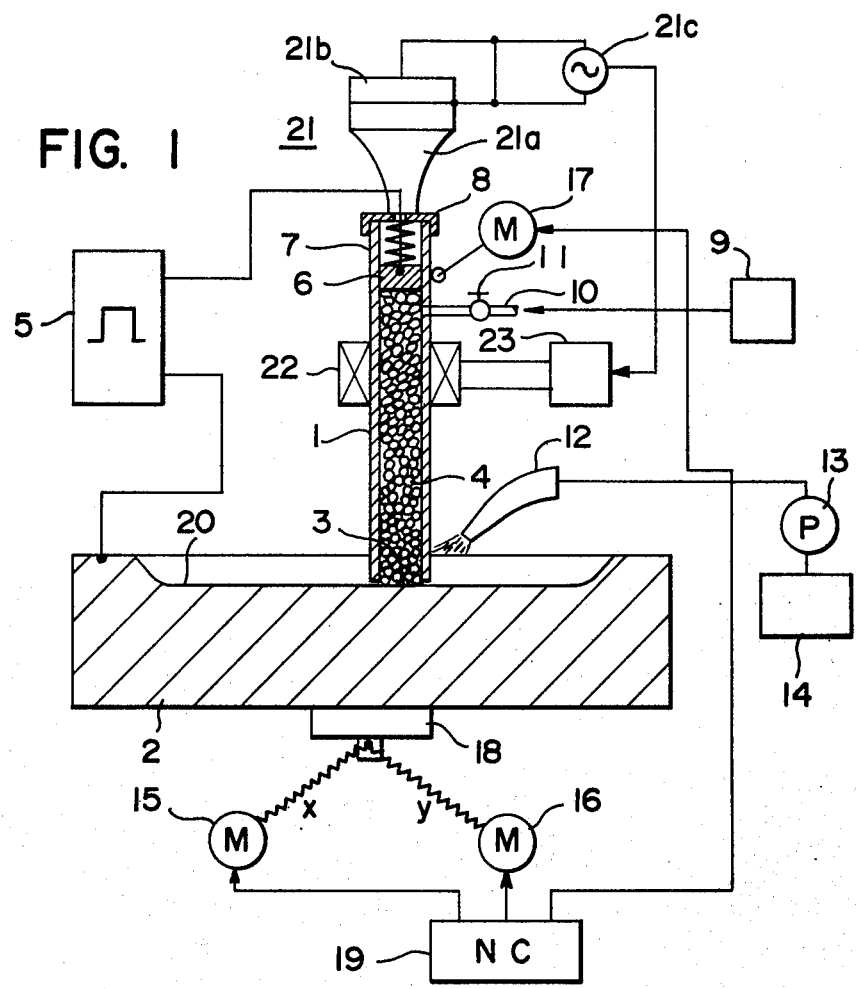
FIG. 1
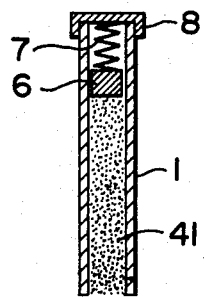 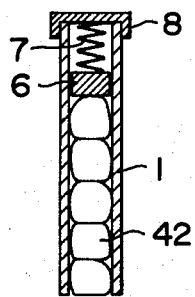 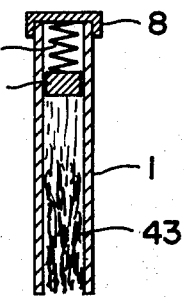
FIG. 2  FIG. 3  FIG. 4

ELECTROEROSIVE MACHINING METHOD AND APPARATUS WITH DISCRETE METALLIC ELECTRODE BODIES

FIELD OF THE INVENTION

The present invention relates to electroerosive machining in general. In particular, it relates to a new and useful method of and apparatus for electroerosively machining an electrically conductive workpiece to form a cavity, especially a three-dimensional (3-D) cavity, therein.

The terms "electroerosion", "electroerosion machining" and "electroerosive" used herein refer to any of diverse electrical machining processes including electrical discharge machining (EDM), electrochemical machining (ECM) and electrochemical-discharge machining (ECDM) in which a machining electric current is directly passed between the workpiece and one or more electrodes constituted as a tool through a machining fluid medium to remove material from the workpiece by the action of electrical discharges (EDM), the action of electrolytic solubilization (ECM) or a combination of the two distinct actions (ECDM).

BACKGROUND OF THE INVENTION

The conventional electroerosion machining technique commonly calls for a tool electrode in the form of a shaped block or metal sheet, a wire, a simple rod or the like, whose contour is reproduced directly or indirectly in a workpiece to constitute a desired cavity therein. The tool electrode must, therefore, be shaped and sized precisely to correspond to the desired cavity shape and size. In modern electroerosion machining systems, the tool electrode is displaced relative to the workpiece three-dimensionally or with three degrees of freedom along a prescribed path which, in conjunction with the shape and size of the tool electrode, determines the ultimate shape and size of a cavity desired in the workpiece. The tool electrode may, however, wear erosively during a given course of machining operation with an electroerosion process. The electrode wear may be reduced substantially to nil with a certain combination of machining parameters but may become significant with a diverse range of combinations of machining parameters which are preferred or desirable. The electrode wear then reaches a stage which requires a repeated electrode replacement or instantaneous corrections of the position of the tool electrode in a predetermined feed displacement path. These measures are generally troublesome, involve relatively sophisticated and expensive means and procedures and are therefore undesirable.

OBJECTS OF THE INVENTION

It is, accordingly, an important object of the present invention to provide a novel electroerosive machining method whereby the conventional problem of tool electrode wear is effectively circumvented.

Another important object of the invention is to provide an improved method of electroerosively machining an electrically conductive workpiece to form a desired cavity therein by effecting machining feed displacement three-dimensionally or with three degrees of freedom along a prescribed path defining the desired contour, wherein the need for a conventional tool electrode subject to wear is eliminated.

Another important object of the invention is to provide a novel electroerosion machining apparatus which is capable of forming a desired cavity efficiently, economically, with the needed machining precision and without a conventional tool electrode.

Other objects will become apparent as the description which follows proceeds.

SUMMARY OF THE INVENTION

In accordance with the present invention there is provided in a first aspect thereof a method of electroerosively machining an electrically conductive workpiece to form a cavity therein, comprising the steps of: axially juxtaposing an elongate, open-ended tubular casing of a heat-resistant material with the workpiece to define an electroerosion machining site in the region of the workpiece proximal to the open-end portion of the casing which has discrete metallic bodies packed therein, each individually capable of constituting an electroerosion electrode; feeding a machining liquid into the machining site; feeding the discrete metallic bodies from the casing successively into the machining site; passing an electroerosion machining current through the machining site between the workpiece and the discrete metallic bodies fed into the machining site to electroerosively remove material from the said region of the workpiece against the discrete metallic bodies functioning as counterelectrodes in the machining fluid; and relatively displacing the heat-resistant casing and the workpiece to cause the said open-end portion to sweep over a predetermined area on the workpiece to electroerosively form the said cavity therein.

The invention also provides in a second aspect thereof an apparatus for electroerosively machining an electrically conductive workpiece to form a cavity therein, the apparatus comprising: an elongate, open-ended tubular casing of a heat-resistant material for retaining discrete metallic bodies therein in a packed state; means for supporting the elongate casing in an axial juxtaposition with the workpiece to define an electroerosion machining site in the region of the workpiece proximate to the open-end portion of the tubular casing; means for feeding a machining fluid into the machining site; means for feeding the discrete metallic bodies from the casing successively into the machining site; means for passing an electroerosion machining current through the machining site between the workpiece and the discrete metallic bodies fed into the machining site to electroerosively remove material from the said region of the workpiece against the bodies functioning as counterelectrodes in the machining fluid; and means for relatively displacing the heat-resistant tubular casing and the workpiece to cause the said open-end portion to sweep over a predetermined area on the workpiece to electroerosively form the cavity therein.

BRIEF DESCRIPTION OF THE DRAWING

These and other features and advantages of the present invention will become more readily apparent from the following description of certain preferred embodiments thereof as taken with the accompanying drawing in which:

FIG. 1 is a schematic view partly in section diagrammatically illustrating an apparatus embodying the principles of the present invention; and FIGS. 2, 3 and 4 are sectional views of elongated, heat-resistant tubular casings having modified forms of discrete metallic bodies packed therein.

SPECIFIC DESCRIPTION

Referring to FIG. 1, an elongate, open-ended tubular casing 1 is shown juxtaposed with a workpiece 2 to define a machining site in the region of the latter proximate to the open end portion 3 of the casing 1. The tubular casing 1 contains discrete metallic bodies 4 therein in a packed state, the bodies being shown in the form of granular particles (e.g. of spherical or irregular shape) which are greater in size than an electroerosion machining gap spacing. The heat-resistant tubular casing 1 is composed, for example, of aluminum oxide ($Al_2O_3$), silicon carbide (SiC) or graphite and has a suitable cross-sectional shape of e.g. a circle, triangle, square, rectangle or other polygon. The discrete bodies 4 may be composed of copper, brass, iron, nickel, molybdenum or manganese but may be of any other conventional electroerosion electrode material.

An electroerosion machining power supply 5 has one output terminal electrically connected to the workpiece 2 and the other output terminal connected to a conductor or electrode 6 arranged in contact with the discrete metallic bodies 4 in the tubular casing 1. A spring 7 is suspended from a cap 8 fitted to the casing 1 at its upper end and is held to be compressed to urge the conductor or electrode 6 under pressure into engagement with the discrete metallic bodies 4 to hold them in a packed state in the casing 1. The bodies 4 may be fed into the casing 1 from a supply 9 via a conduit 10 shown including a cock 11. A machining fluid, e.g. a distilled water liquid, is supplied into the region of the machining site from a nozzle 12. A pump 13 draws the machining fluid from a reservoir 14 and feeds it to the nozzle 12. The pumped machining fluid may also or alternatively be fed into the conduit 10 so that at least a portion thereof is first fed into the casing 1 and, then passing therethrough or traversing interstices of the packed discrete metallic bodies 4 therein, fed into the machining site. Since the discrete metallic bodies 4 are held in a mutual firm contact and in a pressure contact with the conductor or electrode 6, a closed electric circuit is established to pass from the power supply 5 an electroerosion machining current, typically or preferably in the form of a succession of pulses, between the workpiece 2 and the one or more bodies 4 proximate thereto through the machining site traversed by the machining fluid to electroerosively remove material from the workpiece 2 against the bodies 4 in the site functioning as counterelectrodes in the machining fluid medium. The spring 7 serves to apply pressure to the bodies 4 to allow them to be moved as a mass and fed successively into the machining site as the ones in the latter are eroded or worn by reason of the electroerosion action.

As machining proceeds in this manner, the tubular casing 1 and the workpiece 2 are relatively displaced three-dimensionally by feed displacement means including an X-axis motor 15, Y-axis motor 16 and Z-axis motor 17. In the embodiment shown, a worktable 18 on which the workpiece 2 is securely mounted is displaced in an X-Y plane by being driven by the motors 15 and 16 along the X-axis and Y-axis, respectively. The tubular casing 1 is displaced in its axial direction or along the Z-axis downwards and driven by the motor 17. A numerical control (NC) unit 19 is provided to furnish the motors 15, 16 and 17 with drive signals preprogrammed and reproduced therein to displace the casing 1 in a sweeping manner relative to the workpiece 2 along predetermined paths which ultimately define and allow a desired cavity 20 to be electroerosively machined in the workpiece 2.

The discrete metallic bodies 4 may, instead of granular particles shown in FIG. 1, be fine powdery particles as shown in a modification of FIG. 2 and designated at 41, metal flakes as shown in FIG. 3 and designated at 42, or broken metal wires as shown in FIG. 4 and designated at 43.

Although the tubular casing 1 at its open end may be held in contact with the workpiece 2 and this is especially the case when it is composed of electrically insulating material, it is desirable to reciprocate it so that it may repetitively make and break a light contact with the workpiece 2. To this end, a mechanical oscillator 21 is provided, which comprises a vibratile horn 21a in contact with the cap 8, an electromechanical transducer 21b connected to the horn 21a and energizable by a power supply 21c to apply mechanical oscillations to the tubular casing 1.

The machining fluid in electrical discharge machining is preferably a distilled water liquid (e.g. water treated by an ion exchanger) having a resistivity of $10^4$ to $10^5$ ohm-cm or kerosine. With the distilled water, the machining site may be open to the atmosphere. With kerosine, the machining site should be immersed therein to a sufficient depth.

By reason of its resistance to heat, the tubular casing 1 proximate to the workpiece should undergo practically no electroerosive wear and hence can accurately maintain its original dimension and shape. Thus, the consumable "tool" electrode is here constituted by discrete metallic bodies 4 located proximate to the machining site and fed therein while being successively replenished therein. Since the location of this consumable electrode portion and the successive areas of the workpiece are precisely controlled three-dimensionally with feed displacement drive units 15, 16 and 17 under numerical control, a highly accurate cavity of a predetermined shape and size may be made in the workpiece 2.

The apparatus shown also includes a magnetic-field generating coil 22 energizable with a direct or alternating current and preferably with a pulsed DC or AC furnished from a power supply 23 to produce a magnetic field across the machining site. The function of this field generating means or the magnetic field is to widen the electroerosion gap spacing formed between the workpiece 2 and discrete metallic bodies 4 in the machining site, thereby facilitating the removal of gap products, e.g. chips and gases, from the region of the machining gap.

The power supply 23 for the coil 22 is preferably operated to furnish it with the energizing current in synchronism with the casing reciprocation device 21 so that selectively when the casing 1 is retracted to widen the machining gap in each reciprocation cycle, the magnetic field is produced. Since the magnetic field applied in the machining site acts to expand the effective electroerosion or spark-over gap spacing, this system advantageously allows the machining actions or successive discharged to continue without interruption during each casing retraction stroke while retaining the advantage of physically widening the machining gap spacing cyclically. Thus the machining process can be continued with an increased stability and enhanced removal rate.

In the use of the field generating means 22, 23 it is advantageous to make the tubular casing 1 and in particular the discrete metallic bodies 4 of a magnetically permeable material so that lines of magnetic fluxes produced by the coil 22 are concentratively passed through the machining site in the region of the workpiece 2 proximate to the open-end portion of the tubular casing 1. It is thus advantageous to use bodies 4 of iron or nickel, for example. The magnet field should have a field strength (magnetic fluid density) in excess of 200 Gauss.

For example, in an EDM operation according to the invention using a succession of EDM pulses with a peak voltage of 100 volts, a peak current of 25 amperes and a pulse duration $\tau_{on}$ of 8 microseconds, the machining gap (defined between the workpiece 2 and the iron bodies 4 can have effective sparkover gap spacings of 10, 15, 30 and 110 micrometers when the magnetic field applied to the gap site has strengths of 0, 100, 500 and 1000 Gauss, respectively. Thus, for example, with a magnetic field of 1000 Gauss applied, the physical gap spacing can be widened up to 110 micrometers without impeding the desired machining condition and the casing 1 can be reciprocated or cyclically retracted with a maximum stroke of 110 micrometers. The magnetic field may be applied selectively during each reciprocation step of the casing 1.

There is thus provided a novel electroerosion machining method and apparatus in accordance with the present invention wherein the need for a conventional tool electrode is advantageously eliminated and the conventional problems associated with the wear thereof are effectively circumvented.

What is claimed is:

1. A method of electroerosively machining an electrically conductive workpiece to form a cavity therein, comprising the steps of:
    axially juxtaposing an elongate, open-ended tubular casing of a heat-resistant material with said workpiece to define an electroerosion machining site in the region of said workpiece proximal to the open-ended portion of said casing, said casing having discrete metallic bodies packed therein in such a manner that they are arranged in a mutually contacting relationship at least in a longitudinal direction of said casing, each individually capable of constituting an electroerosion electrode;
    feeding a machining fluid into said machining site;
    feeding said discrete metallic bodies in said casing to discharge them successively into said machining region;
    passing an electroerosion machining current through said site between said workpiece and said discrete metallic bodies discharged into the machining site to electroerosively remove material from said region of the workpiece against said bodies functioning as counterelectrodes in said machining fluid; and
    relatively displacing said heat-resistant casing and said workpiece three-dimensionally while maintaining said open-ended portion in the proximity of said region of the workpiece so as to cause said open-ended portion to effectively sweep in a scanning manner over a predetermined zone of said workpiece to form said cavity therein.

2. The method defined in claim 1 wherein said discrete metallic bodies are packed generally randomly in said casing.

3. The method defined in claim 1 wherein said discrete metallic bodies are stacked in said casing in said longitudinal direction thereof.

4. The method defined in claim 1 wherein said discrete metallic bodies are packed, bearing gravitationally in the direction of said workpiece.

5. The method defined in claim 1, claim 2, claim 3 or claim 4 wherein said casing and said workpiece are relatively displaced along a preprogrammed three-dimensional path under numerical control.

6. The method defined in claim 1, claim 2, claim 3 or claim 4 wherein said tubular casing has a cross-sectional shape generally independent of the shape of said desired cavity.

7. A method of electroerosively machining an electrically conductive workpiece to form a cavity therein, comprising the steps of:
    axially juxtaposing an elongate, open-ended tubular casing of a heat-resistant material with said workpiece to define an electroerosion machining site in the region of said workpiece proximal to the open-ended portion of said casing, said casing being composed of a substance selected from the group which consists of aluminum oxide, silicon carbide and graphite and having discrete metallic bodies packed therein each individually capable of constituting an electroerosion electrode;
    feeding a machining fluid into said machining site;
    feeding said discrete metallic bodies from said casing successively into said machining region;
    passing an electroerosion machining current through said site between said workpiece and said discrete metallic bodies fed into the machining site to electroerosively remove material from said region of the workpiece against said bodies functioning as counterelectrodes in said machining fluid; and
    relatively displacing said heat-resistant casing and said workpiece to cause said open-ended portion to sweep over a predetermined area on said workpiece to form said cavity therein.

8. A method of electroerosively machining an electrically conductive workpiece to form a cavity therein, comprising the steps of:
    axially juxtaposing an elongate, open-ended tubular casing of a heat-resistant material with said workpiece to define an electroerosion machining site in the region of the workpiece proximal to the open-ended portion of said casing, said casing having discrete metallic bodies in the form of granular particles packed therein, each individually capable of constituting an electroerosion electrode;
    feeding a machining fluid into said machining site;
    feeding said discrete metallic bodies from said casing successively into said machining region;
    passing an electroerosion machining current through said site between said workpiece and said discrete metallic bodies fed into the machining site to electroerosively remove material from said region of the workpiece against said bodies functioning as counterelectrodes in said machining fluid; and
    relatively displacing said heat-resistant casing and said workpiece to cause said open-ended portion to sweep over a predetermined area on said workpiece to form said cavity therein.

9. The method defined in claim 8 wherein said particles have a particle size greater than the size of the spacing formed between said workpiece and the open end of said tubular casing.

10. A method of electroerosively machining an electrically conductive workpiece to form a cavity therein, comprising the steps of:

axially juxtaposing an elongate, open-ended tubular casing of a heat-resistant material with said workpiece to define an electroerosion machining site in the region of the workpiece proximal to the open-ended portion of said casing, said casing having discrete metallic bodies in the form of a mass of broken wires packed therein, each individually capable of constituting an electroerosion electrode;

feeding a machining fluid into said machining site;

feeding said discrete metallic bodies from said casing successively into said machining region;

passing an electroerosion machining current through said site between said workpiece and said discrete metallic bodies fed into the machining site to electroerosively remove material from said region of the workpiece against said bodies functioning as counterelectrodes in said machining fluid; and relatively displacing said heat-resistant casing and said workpiece to cause said open-ended portion to sweep over a predetermined area on said workpiece to form said cavity therein.

11. A method of electroerosively machining an electrically conductive workpiece to form a cavity therein, comprising the steps of:

axially juxtaposing an elongate, open-ended tubular casing of a heat-resistant material with said workpiece to define an electroerosion machining site in the region of the workpiece proximal to the open-ended portion of said casing, said casing having discrete metallic bodies in the form of a mass of fine powder particles packed therein, each individually capable of constituting an electroerosion electrode;

feeding a machining fluid into said machining site;

feeding said discrete metallic bodies from said casing successively into said machining region;

passing an electroerosion machining current through said site between said workpiece and said discrete metallic bodies fed into the machining site to electroerosively remove material from said region of the workpiece against said bodies functioning as counterelectrodes in said machining fluid; and relatively displacing said heat-resistant casing and said workpiece to cause said open-ended portion to sweep over a predetermined area on said workpiece to form said cavity therein.

12. A method of electroerosively machining an electrically conductive workpiece to form a cavity therein, comprising the steps of:

axially juxtaposing an elongate, open-ended tubular casing of a heat-resistant material with said workpiece to define an electroerosion machining site in the region of the workpiece proximal to the open-ended portion of said casing, said casing having discrete metallic bodies packed therein, said discrete metallic bodies being composed of a substance selected from the group which consists of copper, brass, iron, nickel, molybdenum and manganese and being each individually capable of constituting an electroerosion electrode;

feeding a machining fluid into said machining site;

feeding said discrete metallic bodies from said casing successively into said machining region;

passing an electroerosion machining current through said site between said workpiece and said discrete metallic bodies fed into the machining site to electroerosively remove material from said region of the workpiece against said bodies functioning as counterelectrodes in said machining fluid; and relatively displacing said heat-resistant casing and said workpiece to cause said open-ended portion to sweep over a predetermined area on said workpiece to form said cavity therein.

13. A method of electroerosively machining an electrically conductive workpiece to form a cavity therein, comprising the steps of:

axially juxtaposing an elongate, open-ended tubular casing of a heat-resistant material with said workpiece to define an electroerosion machining site in the region of the workpiece proximal to the open-ended portion of said casing, said casing having discrete metallic bodies packed therein, each individually capable of constituting an electroerosion electrode;

feeding a machining fluid into said machining site;

feeding said discrete metallic bodies from said casing successively into said machining region;

passing an electroerosion machining current through said site between said workpiece and said discrete metallic bodies fed into the machining site to electroerosively remove material from said region of the workpiece against said bodies functioning as counterelectrodes in said machining fluid;

axially reciprocating one of said casing and said workpiece towards and away from the other with a predetermined amplitude; and relatively displacing said heat-resistant casing and said workpiece to cause said open-ended portion to sweep over a predetermined area on said workpiece to form said cavity therein.

14. The method defined in claim 10 wherein one of said casing and said workpiece is brought into a light contacting relationship with the other during each reciprocation cycle.

15. A method of electroerosively machining an electrically conductive workpiece to form a cavity therein, comprising the steps of:

axially juxtaposing an elongate, open-ended tubular casing of a heat-resistant material with said workpiece to define an electroerosion machining site in the region of the workpiece proximal to the open-ended portion of said casing, said casing having discrete metallic bodies packed therein, each individually capable of constituting an electroerosion electrode;

feeding a machining fluid into said machining site;

feeding said discrete metallic bodies from said casing successively into said machining region;

passing an electroerosion machining current through said site between said workpiece and said discrete metallic bodies fed into the machining site to electroerosively remove material from said region of the workpiece against said bodies functioning as counterelectrodes in said machining fluid;

relatively displacing said heat-resistant casing and said workpiece to cause said open-ended portion to sweep over a predetermined area on said workpiece to form said cavity therein; and applying a magnetic field in the region of said machining site.

16. The method defined in claim 12 wherein said magnetic field has a strength in terms of magnetic flux density in excess of 200 Gauss.

17. The method defined in claim 16 wherein said discrete metallic bodies are composed of a magnetically permeable substance.

18. The method defined in claim 12 or claim 16, further comprising the steps of cyclically retracting said casing away from said workpiece and applying said magnetic field selectively during the time of said retraction.

19. The method defined in claim 18 wherein said discrete metallic bodies are composed of a magnetically permeable substance.

20. An apparatus for electroerosively machining an electrically conductive workpiece to form a desired cavity therein, comprising:
- an elongate, open-ended tubular casing of a heat-resistant material for retaining therein discrete metallic bodies in a packed state in which they are arranged in a mutually contacting relationship at least in a longitudinal direction of said casing;
- means for supporting said casing in an axial juxtaposition with said workpiece to define an electroerosion machining site in the region of said workpiece to the open-ended portion of said tubular casing;
- means for feeding a machining fluid into said machining site;
- means for discharging said discrete metallic bodies successively from said casing into said machining region;
- means for passing an electroerosion machining current through said machining site between said workpiece and said discrete metallic bodies discharged into said machining site to electroerosively remove material from said region of the workpiece against said bodies functioning as counterelectrodes in said machining fluid; and
- means for relatively displacing said heat-resistant, tubular casing and said workpiece three-dimensionally while maintaining said open-ended portion in the proximity of said region of the workpiece so as to cause said open-ended portion to sweep in a scanning manner over a predetermined zone of said workpiece to electroerosively form said cavity therein.

21. The apparatus defined in claim 20 wherein said displacing means comprises three motor means for relatively displacing said tubular casing and said workpiece along three mutually orthogonal axes, respectively and a numerical controller unit for furnishing said motor means with a preprogrammed sequence of drive signals to relatively displace said casing and said workpiece along a predetermined three-dimensional path.

22. The apparatus defined in claim 20 or claim 21 wherein said tubular casing has a cross-sectional shape generally independent of the shape of said desired cavity.

23. The apparatus defined in claim 20 wherein said discrete metallic bodies are packed generally randomly in said casing.

24. The apparatus defined in claim 20 wherein said discrete metallic bodies are packed, bearing gravitationally in the direction of said workpiece.

25. The apparatus defined in claim 20 wherein said discrete metallic bodies are stacked in said casing in said longitudinal direction thereof.

26. An apparatus for electroerosively machining an electrically conductive workpiece to form a cavity therein, comprising:
- an elongate, open-ended tubular casing composed of a heat-resistant material selected from the group consisting of aluminum oxide, silicon carbide and graphite for retaining discrete metallic bodies in a packed state therein;
- means for supporting said casing in an axial juxtaposition with said workpiece to define an electroerosion machining site in the region of said workpiece proximal to the open-ended portion of said tubular casing;
- means for feeding a machining fluid into said machining site;
- means for feeding said discrete metallic bodies from said casing successively into said machining region;
- means for passing an electroerosion machining current through said machining site between said workpiece and said discrete metallic bodies fed into said machining site to electroerosively remove material from said region of the workpiece against said bodies functioning as counterelectrodes in said machining fluid; and
- means for relatively displacing said heat-resistant tubular casing and said workpiece to cause said open-ended portion to sweep over a predetermined area on said workpiece to electroerosively form said cavity therein.

27. An apparatus for electroerosively machining an electrically conductive workpiece to form a cavity therein, comprising:
- an elongate, open-ended tubular casing composed of a heat-resistant material for retaining discrete metallic bodies in the form of granular particles in a packed state therein;
- means for supporting said casing in an axial juxtaposition with said workpiece to define an electroerosion machining site in the region of said workpiece proximal to the open-ended portion of said tubular casing;
- means for feeding a machining fluid into said machining site;
- means for feeding said discrete metallic bodies from said casing successively into said machining region;
- means for passing an electroerosion machining current through said machining site between said workpiece and said discrete metallic bodies fed into said machining site to electroerosively remove material from said region of the workpiece against said bodies functioning as counterelectrodes in said machining fluid; and
- means for relatively displacing said heat-resistant tubular casing and said workpiece to cause said open-ended portion to sweep over a predetermined area on said workpiece to electroerosively form said cavity therein.

28. An apparatus for electroerosively machining an electrically conductive workpiece to form a cavity therein, comprising:
- an elongate, open-ended tubular casing composed of a heat-resistant material for retaining in a packed state therein discrete metallic bodies in the form of a mass of fine powder particles;
- means for supporting said casing in an axial juxtaposition with said workpiece to define an electroerosion machining site in the region of said workpiece proximal to the open-ended portion of said tubular casing;
- means for feeding a machining fluid into said machining site;
- means for feeding said discrete metallic bodies from said casing successively into said machining region;

means for passing an electroerosion machining current through said machining site between said workpiece and said discrete metallic bodies fed into said machining site to electroerosively remove material from said region of the workpiece against said bodies functioning as counterelectrodes in said machining fluid; and means for relatively displacing said heat-resistant tubular casing and said workpiece to cause said open-ended portion to sweep over a predetermined area on said workpiece to electroerosively form said cavity therein.

29. An apparatus for electroerosively machining an electrically conductive workpiece to form a cavity therein, comprising:

an elongate, open-ended tubular casing composed of a heat-resistant material for retaining in a packed state therein discrete metallic bodies in the form of a mass of broken wires;

means for supporting said casing in an axial juxtaposition with said workpiece to define an electroerosion machining site in the region of said workpiece proximal to the open-ended portion of said tubular casing;

means for feeding a machining fluid into said machining site;

means for feeding said discrete metallic bodies from said casing successively into said machining region;

means for passing an electroerosion machining current through said machining site between said workpiece and said discrete metallic bodies fed into said machining site to electroerosively remove material from said region of the workpiece against said bodies functioning as counterelectrodes in said machining fluid; and means for relatively displacing said heat-resistant tubular casing and said workpiece to cause said open-ended portion to sweep over a predetermined area on said workpiece to electroerosively form said cavity therein.

30. An apparatus for electroerosively machining an electrically conductive workpiece to form a cavity therein, comprising:

an elongate, open-ended tubular casing composed of a heat-resistant material for retaining in a packed state therein discrete metallic bodies in the form of metallic flakes;

means for supporting said casing in an axial juxtaposition with said workpiece to define an electroerosion machining site in the region of said workpiece proximal to the open-ended portion of said tubular casing;

means for feeding a machining fluid into said machining site;

means for feeding said discrete metallic bodies from said casing successively into said machining region;

means for passing an electroerosion machining current through said machining site between said workpiece and said discrete metallic bodies fed into said machining site to electroerosively remove material from said region of the workpiece against said bodies functioning as counterelectrodes in said machining fluid; and means for relatively displacing said heat-resistant tubular casing and said workpiece to cause said open-ended portion to sweep over a predetermined area on said workpiece to electroerosively form said cavity therein.

31. An apparatus for electroerosively machining an electrically conductive workpiece to form a cavity therein, comprising:

an elongate, open-ended tubular casing composed of a heat-resistant material for retaining discrete metallic bodies in a packed state therein;

means for supporting said casing in an axial juxtaposition with said workpiece to define an electroerosion machining site in the region of said workpiece proximal to the open-ended portion of said tubular casing;

means for feeding a machining fluid into said machining site;

means for feeding said discrete metallic bodies from said casing successively into said machining region;

means for passing an electroerosion machining current through said machining site between said workpiece and said discrete metallic bodies fed into said machining site to electroerosively remove material from said region of the workpiece against said bodies functioning as counterelectrodes in said machining fluid;

means for relatively displacing said heat-resistant tubular casing and said workpiece to cause said open-ended portion to sweep over a predetermined area on said workpiece to electroerosively form said cavity therein; and means for axially reciprocating said casing relative to said workpiece.

32. An apparatus for electroerosively machining an electrically conductive workpiece to form a cavity therein, comprising:

an elongate, open-ended tubular casing composed of a heat-resistant material for retaining in a packed state therein discrete metallic bodies composed of a substance selected from the group which consists of copper, brass, iron, nickel, molybdenum and manganese;

means for supporting said casing in an axial juxtaposition with said workpiece to define an electroerosion machining site in the region of said workpiece proximal to the oepn-ended portion of said tubular casing;

means for feeding a machining fluid into said machining site;

means for feeding said discrete metallic bodies from said casing successively into said machining region;

means for passing an electroerosion machining current through said machining site between said workpiece and said discrete metallic bodies fed into said machining site to electroerosively remove material from said region of the workpiece against said bodies functioning as a counterelectrodes in said machining fluid; and means for relatively displacing said heat-resistant tubular casing and said workpiece to cause said open-ended portion to sweep over a predetermined area on said workpiece to electroerosively form said cavity therein.

33. An apparatus for electroerosively machining an electrically conductive workpiece to form a cavity therein, comprising:

an elongate, open-ended tubular casing composed of a heat-resistant material for retaining discrete metallic bodies in a packed state therein;

means for supporting said casing in an axial juxtaposition with said workpiece to define an electroerosion machining site in the region of said workpiece proximal to the open-ended portion of said tubular casing;

means for feeding a machining fluid into said machining site;

means for feeding said discrete metallic bodies from said casing successively into said machining region;

means for passing an electroerosion machining current through said machining site between said workpiece and said discrete metallic bodies fed into said machining site to electroerosively remove material from said region of the workpiece against said bodies functioning as counterelectrodes in said machining fluid;

means for relatively displacing said heat-resistant tubular casing and said workpiece to cause said open-ended portion to sweep over a predetermined area on said workpiece to electroerosively form said cavity therein; and electromagnetic coil means wound around said casing and energizable by a power supply for applying a magnetic field in the region of said machining site.

\* \* \* \* \*